United States Patent [19]

Guth

[11] 3,923,448

[45] Dec. 2, 1975

[54] FUEL MIXING CHAMBER FOR WELDING AND CUTTING TORCHES

[76] Inventor: Carl R. Guth, 10215 N. 38th St., Phoenix, Ariz. 85028

[22] Filed: Oct. 15, 1974

[21] Appl. No.: 514,456

[52] U.S. Cl. .............. 431/354; 48/180 F; 239/428; 239/429
[51] Int. Cl.² ......................................... F23D 13/40
[58] Field of Search ...... 431/354; 239/416.4, 416.5, 239/417.3, 428, 429, 405; 48/180 F

[56] References Cited
UNITED STATES PATENTS

| | | | |
|---|---|---|---|
| 1,110,516 | 9/1914 | Terry | 239/417.3 |
| 2,092,579 | 9/1937 | Kehl | 239/417.3 |
| 3,588,304 | 6/1971 | Guth | 431/352 |

*Primary Examiner*—Carroll B. Dority, Jr.
*Attorney, Agent, or Firm*—Warren F. B. Lindsley

[57] ABSTRACT

A gas mixing chamber incorporated in a welding, cutting or heating torch utilizing discontinuities in the gas flow paths to create drag and turbulence serving to promote the thorough mixing of the gases prior to combustion, thereby effecting more complete combustion of the fuel and producing a hotter flame.

9 Claims, 7 Drawing Figures

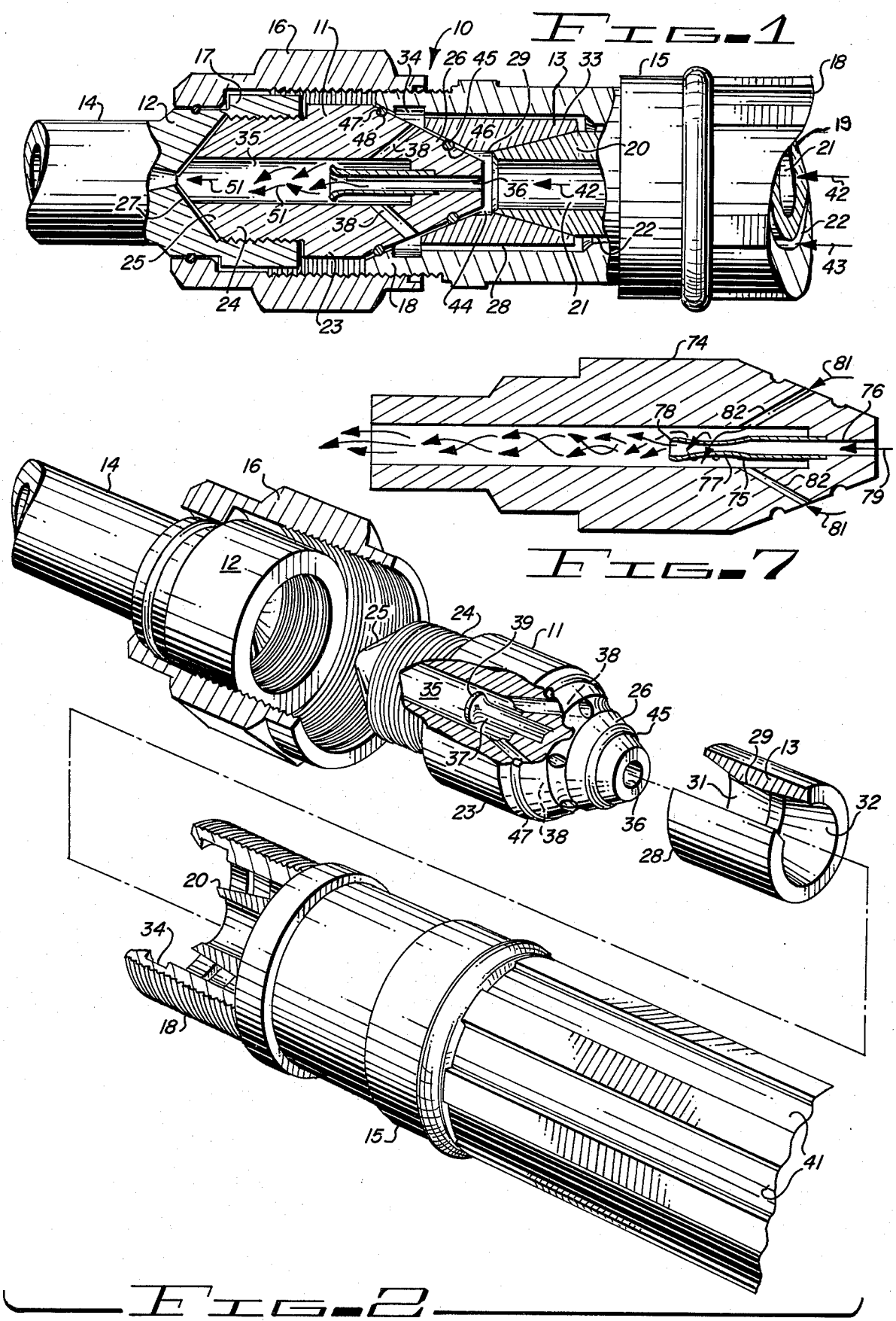

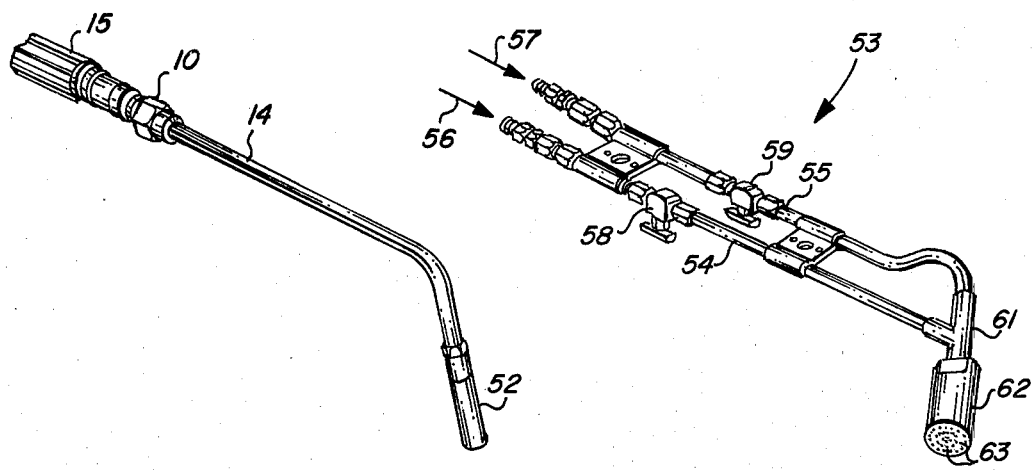
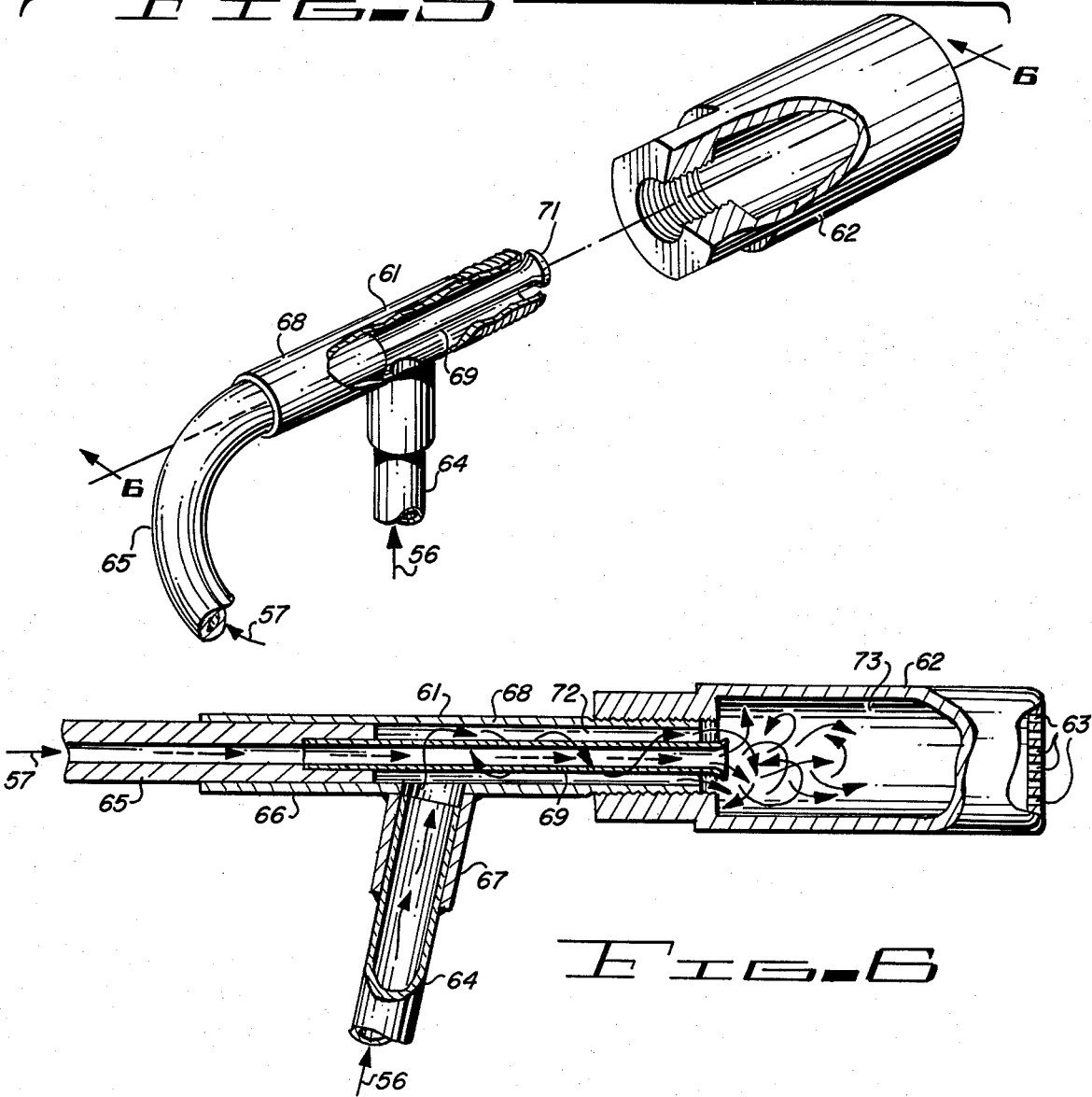

3,923,448

FUEL MIXING CHAMBER FOR WELDING AND CUTTING TORCHES

Background of the Invention

This invention is directed toward welding, cutting and heating torches and is more particularly directed to an improved fuel mixing chamber which is designed to promote the thorough mixing of the gases prior to combustion. Complete combustion produces the highest possible temperature flame for welding, cutting or heating operations for a given fuel consumption.

Heretofore the mixing chamber for such torches have not effectively mixed the gases since the fuel and air or oxygen were simply introduced into a mixing chamber with little or no attention given to its design configuration. For this reason, the gas mixtures were not as homogeneous as possible, the combustion was not effectively controlled, a burning cycle not completed and hence the flame temperature was uneven and of a lower temperature than desired.

Field of the Invention

This invention is particularly directed to a fuel mixing chamber for a welding or cutting torch, the chamber utilizing a tubular orifice having specially designed contours which promote turbulence in the exhausted gas or liquid. The turbulence and attendant drag caused a second gas or liquid to be drawn into the first and promoting a veritable "dog-fight" between the two gases or liquids which effects a very complete mixture prior to combustion required for producing an efficient, uniform and high temperature welding or cutting flame at the tip of the torch.

Description of the Prior Art

Heretofore manufacturers of welding equipment have produced welding and cutting torches incorporating various gas mixing devices for the purpose of creating turbulence in the mixing chamber. The mixing action achieved through this approach, however, is inadequate to produce the high flame temperatures and the uniformity as sought in connection with the present invention.

U.S. Pat. Nos. 3,588,304 3,737,281 and 3,816,061 disclose improved mixing chambers as a part of their heating torches which employ in some instances a fluted tapered shroud. In the present invention, the mixing chamber is modified and adapted for use in welding, cutting and multi-flame heating torches which may be used with such a shroud, if so desired.

Summary of the Invention

In accordance with the invention claimed, a new and improved means is provided for mixing fuel prior to burning at the tip of a welding, cutting or heating torch, the mixing occurring as the result of turbulence and drag created by one or more specially shaped tubular orifices. The disclosed mixing chamber more thoroughly mixes the fuel gases resulting in a more complete combustion and higher temperatures of the working flame than heretofore possible.

It is, therefore, one object of this invention to provide in the fuel mixing chamber of a welding, cutting or heating torch a means for more effectively mixing fuel and oxygen or air prior to combustion, thereby achieving more complete combustion and a higher, more uniform working flame at the tip of the torch.

Another object of this invention is to achieve such an effective mixing action through the use of one or more specially contoured tubular orifices which introduce at their outlet ports a high degree of turbulence and drag, both of which enhance the mixing action by drawing surrounding gases into the gas being discharged from the orifice.

A further object of this invention is to provide in the design of the specially contoured tubular orifice a capability to convert the unidirectional kinetic energy of the gas entering the specially shaped orifice into random, multi-directional kinetic energy characterized by turbulence and a sharp pressure drop or braking effect so that the converted or redirected energy may be more effectively utilized to enhance the mixing action.

A still further object of this invention is to provide in the design of the tubular orifice of a torch an injector action of a special nature which causes the injected gases to be widely dispersed into the surrounding gases.

Further objects and advantages of this invention will become apparent as the following description proceeds and the features of novelty which characterize this invention will be pointed out with particularity in the claims annexed to and forming a part of this specification.

Brief Description of the Drawing

The present invention may be more readily described by reference to the accompanying drawing in which:

FIG. 1 is a cross-sectional view of a gas mixing chamber embodying the features of this invention.

FIG. 2 is a perspective view of an exploded assembly revealing further details of the structure of FIG. 1.

FIG. 3 is a perspective view of a welding torch utilizing the mixing chamber of FIGS. 1 and 2.

FIG. 4 is a perspective view of a multi-flame heating torch incorporating a second embodiment of this invention.

FIG. 5 is an enlarged fragmentary view of an exploded assembly showing additional details of the construction of FIG. 4.

FIG. 6 is a cross-sectional view of the assembly of FIG. 5 taken along the line 6—6.

FIG. 7 is a cross-sectional view of a modification of the gas mixing chamber shown in the assembly of FIGS. 1, 2 and 3.

Description of the Preferred Embodiment

Referring more particularly to the drawings by characters of reference, FIG. 1 illustrates a gas mixing chamber 10 comprising a central torpedo shaped mixing element 11 secured by a down-stream adaptor 12 and an up-stream positioning member 13. Adaptor 12 serves as a transition between member 13 and a torch nozzle means 14 while positioning member 13 is utilized to couple element 11 to coaxial torch handle 15. Coupling nut 16 secures the entire assembly by gripping a shoulder 17 of adaptor 12 as it is threaded over the threaded extension of a cylindrical outer shell or chamber 18 of handle 15 thereby drawing assembly 10 together. Handle 15 further comprises a concentric cylindrical inner shell 19.

Two separate channels are provided within handle 15 for supplying gas to chamber 10. A first channel 21 is provided through the hollow interior of inner shell 19 and the second chammel 22 is provided through a void arranged between the exterior surface of shell 19 and the interior surface of shell 18. Inner shell 19 ends in a conical termination 20 within chamber 10. Outer shell 18 extends somewhat beyond the conical termination 20 of shell 19 with its inner diameter becoming slightly enlarged in this area. Its outer surface is provided with a threaded section at its end as heretofore explained.

The exterior features of mixer element 11 include a smooth cylindrical center section 23, an adjacent threaded cylindrical section 24 of a slightly smaller diameter, a first tapered end 26 extending rearwardly (up stream of the direction of full flow) from section 23.

The threaded surface of section 24 is secured within the mating threaded interior of adaptor 12 and tapered end 25 fits within a conforming cone-shaped cavity 27 within adaptor 12 as shown in FIG. 1.

Positioning member 13 has a cylindrical outer surface 28. Its interior is hollow and symmetrical about its cylindrical axis but its inside diameter of the hollow opening is necked down over a short length 29 located slightly ahead of its center defining a fluted hollow opening tapering outwardly from length 29 upstream and downstream therefrom. The forward or downstream tapered opening 31 conforms to tapered end 26 of element 11 while the rear or upstream tapered opening 32 conforms to the outer surface of conical termination 20 of shell 19.

The forward or downstream extemity of the inner surface of shell 18 is tapered to conform to the outer surface of end 26 of member 11.

By virtue of the above listed conforming surfaces, the drawing together of handle 15 and nozzle 14 around the contained parts including element 11 and member 13 forces the axial alignment and centering of the various parts including element 11, member 13 and shells 18 and 19 of handle 15.

The alignment of the aforementioned parts guarantees a symmetrical void 33 between the cylindrical outer surface 28 of member 13 and the cylindrical inner surface of shell 18, the void 33 serving as a conduit for the flow of gas from channel 22 to an annular opening 34 inside and near the termination of the forward extension of shell 18.

The interior features of mixer element 11 include a first axial cylindrical channel 35 shown in FIGS. 1 and 2 extending from near the center of element 11 forward through the tip of tapered end 25, a second axial cylindrical channel 36 of a somewhat smaller diameter extending forward from the tip of tapered end 26 and terminating in channel 35, a hollow nozzle 37 extending forward from the forward or downstream end of channel 36, and one or more lead-in ports 38 sloping inwardly from the tapered surface of end 26 and terminating in channel 35 at a point just forwardly of the junction of channels 35 and 36 but to the rear of the forward termination of nozzle 37.

Nozzle 37 has a flared, bell shaped terminal end 39 and the remainder of its length is cylindrical with a diameter appropriate to allow it to fit inside channel 36, as shown, in a snug interference fit.

The exterior surface 41 of handle 15 is grooved longitudinally for ventilation by circulating air of the handle as it is gripped by the operator's hand.

The operating characteristics and features of the gas mixing chamber 10 will now be described assuming a flow of oxygen 42 in the interior 21 of shell 19 of handle 15, moving from right to left and a fuel gas 43 flowing in channel 22 of handle 15 from right to left, as shown in FIG. 1.

As the oxygen or air 42 reaches the forward end of shell 19, it reaches a chamber 44 which is enclosed by the forward end of shell 19, the tip of end 26 of element 11 and the inside surfaces of member 13. By virtue of the snug fit between member 13 and the conical termination 20 of shell 19, the flow of oxygen between these mating surfaces is prevented. A first O-ring 45 carried in an annular groove 46 in the tapered surface of end 26 prevents the flow of oxygen between end 26 and the forward interior surface of member 13. The flow of oxygen from chamber 44 is thus restricted to entry into channel 36. Because of the considerably smaller diameter of channel 36 relative to the diameter of interior 21 there is a sharp increase in the velocity of oxygen 42 as it enters channel 36. Furthermore, there is a high degree of turbulence inside channel 36 because of the discontinuity in the flow path in the vicinity of chamber 44. The oxygen flow 42 inside channel 36 and forward through nozzle 37 is thus highly turbulent and at a relatively high velocity.

At the same time, the fuel gas 43 supplied from channel 22 of handle 15 flows forwardly through void 33 into annular opening 34. The rearward flow of gas 43 between the mating surfaces of end 26 and member 13 is prevented by O-ring 45 while a second O-ring 47 resting in an annular groove 48 located in the tapered surface of end 26 at a point forward of opening 34 prevents the flow of gas 43 between the surfaces of the forward termination of shell 18 and end 26. The flow of gas 43 from opening 34 is thus restricted to entry into ports 38 whose openings are aligned with opening 34. Because of the relatively small diameter of ports 38 the flow of gas 43 therein is at a high velocity. Gas 43 thus enters channel 35 at high velocity and surrounds nozzle 36 in a swirling, turbulent flow pattern and as it moves forward past the flared end of nozzle 37, the drag of flared end 39 produces additional turbulence of a nature which produces a violent mixing action between the meeting flow paths of the oxygen 42 and the gas 43. Because of this violent and consequently thorough mixing action, a uniform mixture 51 of gas and oxygen is produced within channel 35, the mixture 51 being carried forward inside torch nozzle 14.

The incorporation of mixing chamber 10 in the design of a welding torch is illustrated in FIG. 3 which shows the torch handle 15, mixing chamber 10 and torch nozzle means 14, as already described with nozzle means 14 terminating in a typical welding tip 52. In this application the very thorough mixture of gas produced by the mixing chamber 10 produces a uniform cutting flame of an appreciably higher temperature than had been possible with prior art arrangements. A variation of mixing chamber 10 is also applicable to the multi-flame heating torch 53 of the type shown in FIG. 4. In the illustration of FIG. 4 there are two gas flow paths 54 and 55. Flow path 54 typically carries oxygen 56 and path 55 carries a fuel gas 57, both entering from the left as shown. A first flow valve 58 governs the oxygen rate of flow while a second flow valve 59 governs the rate of flow of fuel gas. The two paths 54 and 55 meet in a gas mixing chamber 61 from which the mixture of oxygen and gas flows forward into a multi-port tip 62 to be exhausted through a multiplicity of ports 63 for burning.

Details of the interior structure of mixing chamber 61 are shown in FIGS. 5 and 6 where the mixing chamber 61 is shown along with the tip 62, an oxygen delivery tube 64 and a fuel gas delivery tube 65.

Mixing chamber 61 has a hollow tubular T-shaped housing 66, the T-shape being tilted forward slightly so that the upright member 67 joins the horizontal member 68 at an angle other than 90 degrees.

Gas delivery tube 65 fits snugly inside one end of member 68 and tip 62 is threadedly attached over the outer surface of the opposite end of member 68 while oxygen delivery tube 64 fits snugly inside the lower end of vertical member 67.

Extending forwardly from gas delivery tube 65 inside member 68 is a hollow tubular nozzle 69 which is very similar to nozzle 36 of FIGS. 1 and 2. Its hollow tubular body fits snugly inside the end of gas delivery tube 65 and its opposite end with its flared opening 71 terminates just short of the end of member 68. The outside diameter of nozzle 69 as well as the outside diameter of opening 71 is somewhat smaller than the inside diameter of member 68. The resulting void provides a flow channel 72 around nozzle 69.

Tip 62 which is threadably attached over the right hand end of member 68 has a hollow cylindrical interior chamber 73.

In operation, a fuel gas 57 enters through tube 65 while oxygen 56 under pressure is supplied through tube 64. The oxygen 56 enters channel 72 in a swirling pattern encircling nozzle 69 as indicated by arrows. A slight reduction in pressure attending the expansion of the oxygen within channel 72 in cooperation with the high velocity swirling flow pattern produces a cooling effect which reduces the flow of heat from tip 62 rearward toward the operator's hands.

As the oxygen 56 moves forward past flared opening 71 and through the opening between the outside surface of flared opening 71 and the inside surface of member 68 it experiences a high degree of resistance and drag as described in connection with the similar arrangement of FIGS. 1 and 2, the resulting turbulence and randomly directed kinetic energy of the merging gas and oxygen flow paths producing again a violent mixing action resembling a "dog-fight" in the interior chamber 73 of tip 62.

Because of the extremely thorough mixing action thus produced within chamber 73, a uniform mixture of gas and oxygen emerges from each of the many individual ports 63 so that a uniform and a high temperature flame pattern is produced at the tip of the torch. With less effective mixing actions as typical of prior art equipment there is a relatively wide variation in gas and oxygen ratios at different ports so that incomplete combustion, reduced flame temperature and a non-uniform flame pattern are experienced with such prior art equipment.

While the present invention is based primarily upon the use of the particular flared nozzles 37 and 69, variations in the geometry of the nozzle are contemplated in this disclosure and are considered to be embraced by this invention. One such variation is illustrated in FIG. 7 which shows a mixing element 74 similar to element 11 of FIGS. 1 and 2, the only variation from element Nozzle 75, as shown in FIG. 7, again has a tubular cylindrical body which fits inside a first gas entry channel 76. To the right and downstream from the cylindrical body the nozzle narrows down into a venturi section 77 after which it flares outwardly just prior to being terminated by an inwardly projecting restriction 78 at the end. Optimization of the mixing action between the gases 79 and 81 entering at ports 76 and 82, respectively, is possible through variations in nozzle geometry as exemplified in the two variations shown.

It should be recognized that the fuel and air or oxygen passageways may be utilized to conduct either fuel or air or oxygen, as desired, and still fall within the scope of this invention.

Such variations and others will be obvious to those skilled in the art and these and other changes and modifications may be made without departing from the spirit of the invention or from the scope of the appended claims.

What is claimed is:

1. A mixing chamber for a fuel burner comprising:
   a control fuel mixing element,
   an upstream outer shell for connection to handle means,
   a downstream adaptor for connection with a nozzle means,
   said fuel mixing element, upstream outer shell and downstream adaptor all having an opening extending therethrough for jointly defining a first gas passageway,
   coupling means for axially aligning said fuel mixing element, upstream outer shell and downstream adaptor and placing their openings in axial alignment,
   nozzle means having an outer diameter smaller than the opening of said mixing element and arranged therein,
   said nozzle means defining a gas expansion space between it and the inside periphery of said opening of said mixing element, and having a flared end at its downstream end for discharging a first gas therethrough, and
   means defining a second gas passageway extending through said fuel mixing element and into its hollow opening laterally of said nozzle means for discharging a second gas transmitted thereby laterally of said flared end of said nozzle means in the downstream direction of the movement of the first gas through said nozzle means,
   said flared end of said nozzle means retarding the movement of the second gas over the discharging end of said nozzle means into the stream of said first gas discharged by the nozzle means and creating eddies in the mixing first and second gases.

2. The mixing chamber set forth in claim 1 wherein:
   said fuel mixing element has a torpedo shaped configuration with one conical end extending into said adaptor and the other conical end extending into said outer shell.

3. The mixing chamber set forth in claim 2 wherein:
   said coupling means extends between said adaptor and said outer shell and is adapted to draw said adaptor and outer shell together thereby positioning one conical end of said mixing element in said adaptor and the other conical end in said outer shell.

4. The mixing chamber set forth in claim 3 wherein:
   said mixing element is provided with more than one duct extending through the conical surface of the upstream end of said mixing element and into said first gas passageway at a point upstream of said flared end of said nozzle means.

5. The mixing chamber set forth in claim 1 in further combination with:
   handle means for connection to said outer shell,
   said handle means including a pair of coaxial gas passageways one for connection with said first gas passageway and the second for connection with said second gas passageway.

6. The mixing chamber set forth in claim 4 in further combination with:
   an annular groove formed in the upstream end of said mixing element, and
   each duct extending from said annular groove through said mixing element.

7. The mixing chamber set forth in claim 6 in further combination with:
   handle means for connection to said outer shell, said handle means including a pair of coaxial gas passageways one for connection with said first gas passageway and the second for connection with said annular groove.

8. The mixing chamber set forth in claim 1 wherein:
   said nozzle means is necked down between its end to provide a venturi section.

9. The mixing chamber set forth in claim 4 wherein:
   said nozzle means is necked down between its end to provide a venturi section.

* * * * *